US008205812B2

(12) United States Patent
Hester et al.

(10) Patent No.: US 8,205,812 B2
(45) Date of Patent: Jun. 26, 2012

(54) ENCLOSURES FOR MULTIPLE FLUIDIC OSCILLATORS

(75) Inventors: Russell D. Hester, Odenton, MD (US); Keith Berning, Jessup, MD (US)

(73) Assignee: Bowles Fluidics Corporation, Columbia, MD (US)

( * ) Notice: Subject to any disclaimer, the term of this patent is extended or adjusted under 35 U.S.C. 154(b) by 318 days.

(21) Appl. No.: 12/592,366

(22) Filed: Nov. 23, 2009

(65) Prior Publication Data

US 2010/0072307 A1   Mar. 25, 2010

Related U.S. Application Data

(63) Continuation-in-part of application No. 11/245,396, filed on Oct. 6, 2005, now Pat. No. 7,677,480.

(51) Int. Cl.
*B05B 1/08* (2006.01)
*B05B 1/18* (2006.01)
*B05B 1/14* (2006.01)
*F15C 1/22* (2006.01)

(52) U.S. Cl. ............... 239/589.1; 239/556; 239/558; 137/814

(58) Field of Classification Search ............ 239/11, 239/536, 548, 556, 558–561, 567, 568, 589.1, 239/600, DIG. 7; 137/803, 814, 833
See application file for complete search history.

(56) References Cited

U.S. PATENT DOCUMENTS

| | | | |
|---|---|---|---|
| 3,185,166 A | 5/1965 | Horton | 137/81.5 |
| 3,563,462 A | 2/1971 | Bauer | 239/456 |
| 3,741,481 A * | 6/1973 | Bauer | 239/589.1 |
| 3,770,200 A * | 11/1973 | Bauer et al. | 239/124 |
| 4,052,002 A | 10/1977 | Stouffer | 239/4 |
| 4,151,955 A | 5/1979 | Stouffer | 239/11 |
| 4,157,161 A | 6/1979 | Bauer | 239/11 |
| 4,185,777 A * | 1/1980 | Bauer | 239/394 |
| 4,231,519 A | 11/1980 | Bauer | 239/4 |
| 4,398,664 A | 8/1983 | Stouffer | 239/11 |
| 4,463,904 A | 8/1984 | Bray | 239/284 |
| 4,508,267 A | 4/1985 | Stouffer | 239/11 |
| 4,562,867 A | 1/1986 | Stouffer | 137/811 |
| 4,645,126 A | 2/1987 | Bray | 239/11 |
| 5,035,361 A | 7/1991 | Stouffer | 239/589.1 |
| 5,181,660 A | 1/1993 | Stouffer et al. | 239/589.1 |
| 5,213,269 A | 5/1993 | Srinath et al. | 239/589.1 |
| 5,749,525 A | 5/1998 | Stouffer | 239/284.1 |
| 5,820,034 A | 10/1998 | Hess | 239/589.1 |

(Continued)

*Primary Examiner* — Darren W Gorman
(74) *Attorney, Agent, or Firm* — J. A. McKinney & Assoc., LLC (57) ABSTRACT

An improved fluidic device that operates on a pressurized liquid flowing through it at a specified flow rate to generate an oscillating spray of liquid droplets having desired properties (e.g., average spatial distribution, size, velocity, frequency and wavelength of liquid droplets at a defined distance in front of the device) includes: (a) a plurality of fluidic oscillators, each having a channel that is part of a fluidic circuit for inducing oscillations in the pressurized liquid that flows through the oscillator, (b) a housing having an exterior surface that includes a front face with a center-point and a rear face, (c) a plurality of passages, each of which extends through the housing and intersects with its front face to define an outlet, with each passages configured to allow for the insertion of one of the plurality of fluidic oscillators into each of the plurality of passages, and (d) a geometrical arrangement of these outlets in the housing front face that is chosen so as to achieve the desired properties of the oscillating spray when the device is operating at its specified flow rate.

20 Claims, 5 Drawing Sheets

U.S. PATENT DOCUMENTS

| | | | |
|---|---|---|---|
| 5,845,845 A | 12/1998 | Merke et al. | 239/1 |
| 5,906,317 A | 5/1999 | Srinath | 239/284.1 |
| 5,971,301 A | 10/1999 | Stouffer et al. | 239/589.1 |
| 6,062,491 A | 5/2000 | Hahn et al. | 239/284.2 |
| 6,186,409 B1 | 2/2001 | Srinath et al. | 239/1 |
| 6,240,945 B1 | 6/2001 | Srinath et al. | 137/14 |
| 6,253,782 B1 | 7/2001 | Raghu | 137/14 |
| RE38,013 E | 3/2003 | Stouffer | 239/284.1 |
| 6,805,164 B2 | 10/2004 | Stouffer | 137/833 |
| 6,904,626 B1 * | 6/2005 | Hester et al. | 4/541.6 |
| 2003/0234303 A1 | 12/2003 | Berning et al. | 239/589.1 |
| 2004/0164189 A1 | 8/2004 | Berning et al. | 239/589.1 |
| 2004/0227021 A1 | 11/2004 | Romack et al. | 239/589.1 |
| 2006/0108442 A1 | 5/2006 | Russell et al. | |

* cited by examiner

FIG. 1A

SECTION B-B
FIG. 1B

SECTION A-A
FIG. 1C

ENCLOSURES FOR MULTIPLE FLUIDIC OSCILLATORS

CROSS-REFERENCE TO RELATED APPLICATION

This application is a continuation-in-part of applicants' patent application U.S. Ser. No. 11/245,396, filed Oct. 6, 2005, now U.S. Pat. No. 7,677,480 and titled "Enclosures For Fluidic Oscillators."

BACKGROUND OF THE INVENTION

1. Field of the Invention

This invention relates to fluid handling processes and apparatus. More particularly, this invention relates to new methods and apparatus for enclosing fluidic oscillators or inserts so as to improve their performance.

2. Description of the Related Art

Fluidic inserts or oscillators are well known for their ability to provide a wide range of distinctive liquid sprays by cyclically deflecting, without the use of mechanical moving parts, the flow of a liquid jet. The distinctiveness of these sprays is due to the fact that they are characterized by being oscillatory in nature, as compared to the relatively steady state flows that are emitted from standard spray or shear nozzles.

U.S. Pat. No. 4,052,002 (Stouffer & Bray) shows in its FIGS. 5-7 some of the typical liquid droplet spray patterns that can be produced by fluidic oscillators (wherein the droplet patterns illustrated represent the droplets produced during one complete cycle of the cyclically deflected liquid jet). It shows what can be considered to be the essentially temporally varying, planar flow pattern of a liquid jet or spray that issues from the oscillator into a surrounding gaseous environment and breaks into droplets which are distributed transversely (i.e., in the assumed y-direction) to the jet's assumed, generally x-direction of flow. Such spray patterns may be described by the definable characteristics of their droplets (e.g., the volume flow rate of the spray, the spray's area of coverage, the spatial distribution of droplets in planes perpendicular to the direction of flow of the spray and at various distances in front of the oscillator's outlet, the average droplet velocities, the average size of the droplets, and the frequency at which the droplets impact on an obstacle in the path of the spray).

A fluidic insert is generally thought of as a thin, rectangular member that is molded or fabricated from plastic and has an especially-designed, liquid flow channel (or a means for inducing oscillations in the liquid that flows through the channel) fabricated into either its broader top or bottom surface, and sometimes both (assuming that this fluidic insert is of the standard type that is to be inserted into the cavity of a housing whose inner walls are configured to form a liquid-tight seal around the insert and form an outside wall for the insert's boundary surface/s which contain the especially designed flow channels). Pressurized liquid enters such an insert and is sprayed from it. Appropriate selection of the arrangement of the oscillator's flow channel and its dimensions are seen, at a specified flow rate, to control the properties of the sprayed oscillating liquid droplets.

Although it is more practical from a manufacturing standpoint to construct these inserts as thin rectangular members with flow channels in their top or bottom surfaces, it should be recognized that they can be constructed so that their liquid flow channels are placed practically anywhere (e.g., on a plane that passes though the member's center) within the member's body; in such instances the insert would have a clearly defined channel inlet and outlet. For example, see U.S. Pat. No. 5,820,034 (Hess) and its FIGS. 3-4 which show a two-part, fluidic insert whose exterior surface is cylindrical so that this insert can be fitted into a similarly shaped housing.

Additionally, it should be recognized that these flow channels need not be of a uniform depth. For example, see U.S. Pat. No. 4,463,904 (Bray), U.S. Pat. No. 4,645,126 (Bray) and RE38,013 (Stouffer) for fluidic oscillators in which the bottom surfaces of these channels are discretely and uniformly sloped so as to impact the ways in which the sprays from these oscillators spread as the move away from the oscillator's outlet.

There are many well known designs of fluidic circuits that are suitable for use with such fluidic inserts. Many of these have some common features, including: (a) at least one power nozzle configured to accelerate the movement of the liquid that flows under pressure through the insert, (b) an interaction chamber through which the liquid flows and in which the flow phenomena is initiated that will eventually lead to the spray from the insert being of an oscillating nature, (c) a liquid inlet, (d) a pathway that connects the inlet and the power nozzle/s, and (e) an outlet or exit from which the liquid exits the insert in the form of a spray.

Examples of fluidic circuits may be found in many patents, including U.S. Pat. No. 3,185,166 (Horton & Bowles), U.S. Pat. No. 3,563,462 (Bauer; feedback oscillator, which introduces some of the terminology that has become common in the fluidic oscillator industry, e.g., "power nozzle," "feedback or control passage"), U.S. Pat. No. 4,052,002 (Stouffer & Bray), U.S. Pat. No. 4,151,955 (Stouffer; island oscillator), U.S. Pat. No. 4,157,161 (Bauer), U.S. Pat. No. 4,231,519 (Stouffer), which was reissued as RE 33,158, U.S. Pat. No. 4,508,267 (Stouffer), U.S. Pat. No. 5,035,361 (Stouffer), U.S. Pat. No. 5,213,269 (Srinath), U.S. Pat. No. 5,971,301 (Stouffer; box oscillator), U.S. Pat. No. 6,186,409 (Srinath), U.S. Pat. No. 6,253,782 (Raghu; mushroom oscillator), U.S. Pat. No. 7,014,131 (Berning et al.; double-sided oscillator), U.S. Patent Application Publication No. (USPAP) 2005/0087633 (Gopalan; three power nozzle, island oscillator), U.S. Pat. No. 7,267,290 (Gopalan & Russell; cold-performing mushroom oscillator), U.S. Pat. No. 7,472,848 (Gopalan & Russell; stepped, mushroom oscillator), U.S. Pat. No. 7,478,764 (Gopalan; thick spray oscillator), USPAP 2008/0011868 (Gopalan; interacting oscillators) and USPAP 2009/0236449 (Gopalan et al.; split throat oscillator).

Despite much prior art relating to the development of fluidic circuits, the nature of the housings or enclosures that surround fluidic oscillators have not changed much over the years. For example, for automotive windshield washing applications (one of the first areas in which such fluidic inserts were extensively used) a typical housing's exterior shape is aerodynamically configured from its rear face to its front face in consideration of the fact that this housing will be mounted on an automobile's hood and in front of its windshield. In such a housing's front face is an especially configured cavity or cavities that accommodate, via a press-fit insertion, one or two, see U.S. Pat. No. 6,062,491 (Hahn), fluidic oscillators. Such housings can also be modified to accommodate a diverging stack of such oscillators; see U.S. Pat. No. 7,111,800 (Berning et al.).

Figure 3:
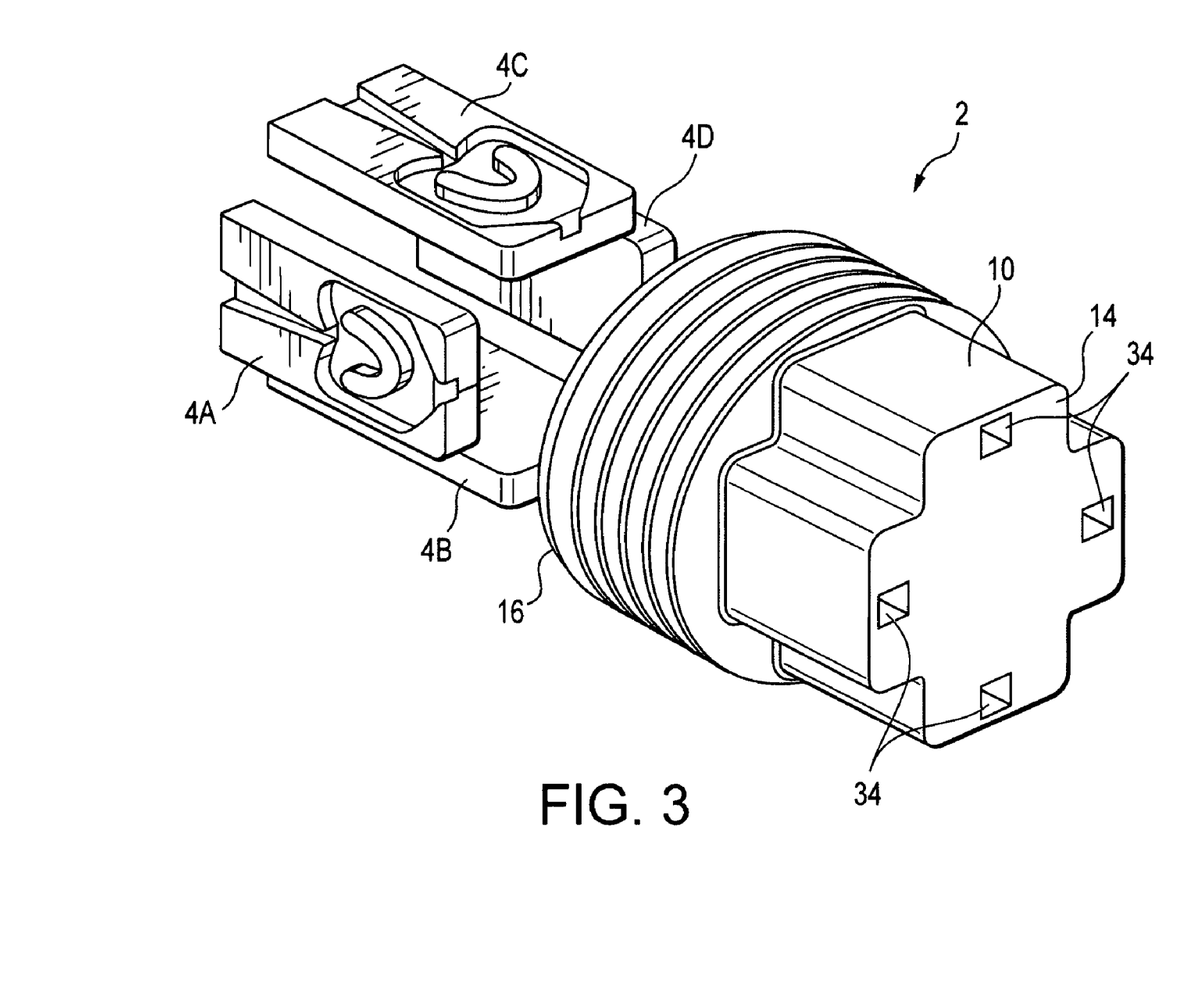

While one generally thinks of the enclosures for these oscillators as being of an almost totally enclosing nature, this need not be the case, see FIG. 3 from U.S. Pat. No. 5,845,845 (Merke et al.) which shows a "lid" for enclosing only the boundary surface of the oscillator in which the fluidic circuit is located.

As fluidic oscillators have continued to be used in more types of applications, the opportunity has arisen to re-examine and improve upon the design of their enclosures as a way to improve upon the overall spraying performance of the nozzle assemblies, etc. which use fluidic oscillators.

OBJECTS AND ADVANTAGES

There has been summarized above, rather broadly, the prior art that is related to the present invention in order that the context of the present invention may be better understood and appreciated. In this regard, it is instructive to also consider the objects and advantages of the present invention.

It is an object of the present invention to provide an assortment of individual housings or enclosures for fluidic oscillators that can be helpful in improving upon the actual spray performance of the spray devices or nozzle assemblies that utilize fluidic oscillators.

It is an object of the present invention to provide fluidic spray assemblies (i.e., fluidic oscillators with novel enclosures) that can provide specific types of desired sprays that have heretofore not been achievable with conventional fluidic technology. For example, to uniformly cover a relatively large surface area (e.g., a 400 cm$^2$ area at a distance of 30 cm from the spray head's exit) with liquid droplets that have large diameters (e.g., >2 mm), high velocities (e.g., > or ~4 msec) and possibly pulsating frequencies that are in the range of perception by the human body (e.g., < or ~30-60 hertz).

It is an object of the present invention to provide improved and more versatile enclosures and fluidic spray assemblies that are ideally designed for shower head and body spray applications.

It is an object of the present invention to provide enclosures and fluidic spray assemblies that operate at low flow rates in shower head and body spray applications so as to yield significant water savings.

It is an object of the present invention to provide improved enclosures and fluidic spray assemblies that are ideally designed for an assortment of commercial cleaning applications.

It is an object of the present invention to provide enclosures and fluidic spray assemblies that can allow for reduced flow rates, while still yielding sprays that provide the same tactile sensations as they impact upon the skin of a user.

It is an object of the present invention to provide enclosures and fluidic spray assemblies that can allow for reduced energy consumption, while still yielding sprays that provide the same tactile sensations as they impact upon the skin of a user.

It is an object of the present invention to provide enclosures and fluidic spray assemblies that can make "less water" feel like "more water" (i.e., providing low flow rate sprays that provide the same tactile sensations as they impact upon the skin of a user).

It is an object of the present invention to provide enclosures and fluidic spray assemblies that prove to be ideally suited for shower massaging applications.

It is an object of the present invention to provide enclosures and fluidic spray assemblies that prove to be ideally suited for shower non-massaging applications.

It is an object of the present invention to provide enclosures and fluidic spray assemblies that allow a user to better direct and control the location of the areas being wetted by the sprays from such assemblies.

These and other objects and advantages of the present invention will become readily apparent as the invention is better understood by reference to the accompanying summary, drawings and the detailed description that follows.

SUMMARY OF THE INVENTION

Recognizing the need for the development of improved enclosures and fluidic spray assemblies to more effectively and efficiently provide a wider range of desired spray distributions, the present invention is generally directed to satisfying the needs set forth above and overcoming the disadvantages identified with prior art devices and methods.

In accordance with the present invention, a fluidic device that operates on a pressurized liquid flowing through it at a specified flow rate to generate an oscillating spray of liquid droplets into a surrounding gaseous environment and with the spray having desired properties (e.g., average spatial distribution, size, velocity, frequency and wavelength of liquid droplets at a defined distance in front of the device) includes: (a) a plurality of fluidic oscillators, each having a channel that is part of a fluidic circuit for inducing oscillations in the pressurized liquid that flows through the oscillator so as to emit a liquid jet in the form of an oscillating spray of liquid droplets, (b) a housing having an exterior surface that includes a front face with a center-point and a rear face and an intermediate boundary surface that connects the said faces, (c) a plurality of passages, each of which extends through the housing and intersects with the front and rear faces, with each passages configured to allow for the insertion of one of the plurality of fluidic oscillators into each of the plurality of passages, wherein the intersections of the passages with the housing front face defining a plurality of outlets, and (d) a geometrical arrangement of these outlets in the housing front face that is chosen so as to achieve the desired properties of the oscillating spray when the device is operating at its specified flow rate.

Thus, there has been summarized above, rather broadly, the present invention in order that the detailed description that follows may be better understood and appreciated. There are, of course, additional features of the invention that will be described hereinafter and which will form the subject matter of the claims to this invention.

BRIEF DESCRIPTION OF THE DRAWINGS

FIGS. 1A-1C show a perspective, top cross-sectional and side cross-sectional view of a first preferred embodiment of the present invention.

FIG. 1D shows a perspective view of a preferred embodiment of the present invention in the form of an enclosure for use in a "body spray" assembly.

FIGS. 2A-2E show views of the front faces of various multi-cavity enclosures that further illustrates the present invention.

FIG. 3 shows a preferred embodiment of the present invention in the form of a housing that accommodates four fluidic oscillators.

FIG. 4 shows the front face of a showerhead embodiment of the present invention that has multiple modes of operation.

FIG. 5A-5B show perspective views of the front and rear faces, respectively, of a preferred embodiment of the present invention in the form of a housing that accommodates twelve fluidic oscillators.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

A common problem encountered in developing and producing fluidic oscillators or inserts for use in automotive windshield applications is designing a fluidic circuit which can give the desired spray characteristics (e.g., at flow rates of 400 ml/minute and operating pressures of 9 psig, uniform coverage with spray droplets of a target area located approximately 25 cm in front of the sprayer and having a target area width of approximately 80 cm) and which can be fitted into a housing which is very limited on its allowable size. Because such housings often are situated in locations on an automobile's hood that are quite visible, their allowable dimensions are often dictated by aesthetic considerations (e.g., typical acceptable widths are on the order of 10-12 mm). The consequence of this is that the spray from the windshield washers situated in such housings must have, what is referred to as, a large horizontal fan angle, $\phi$.

Since such inserts and their enclosures are typically made by plastic injection molding methods, those knowledgeable with such manufacturing methods will understand that such manufacturing methods impose further constraints on the geometry of such inserts and their enclosures. For example, a 12 mm wide housing can only accommodate a fluidic insert having a maximum width of about 9 mm since the wall thickness of such housings must typically be about 1 mm or larger.

In striving to improve the performance of various types of fluidic sprayers, we have discovered that there are significant opportunities to create and introduce new enclosures for these fluidic oscillators that appreciably improve their performance.

Figure 1A:
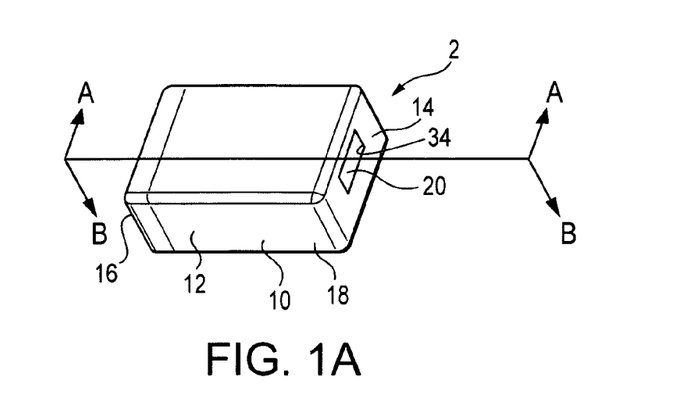
Figure 1B:
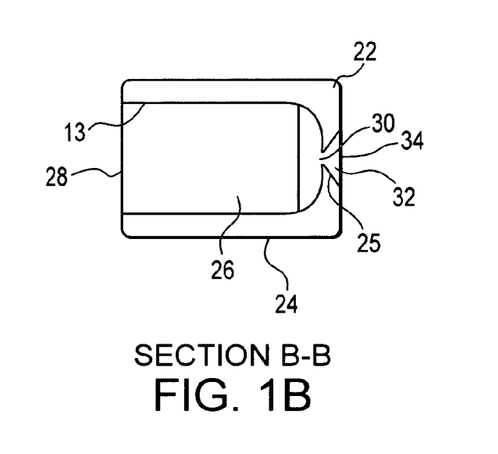
Figure 1C:
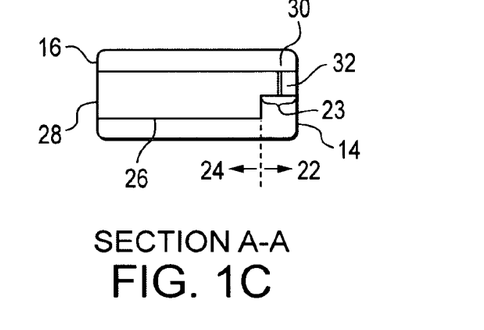
Figure 1D:
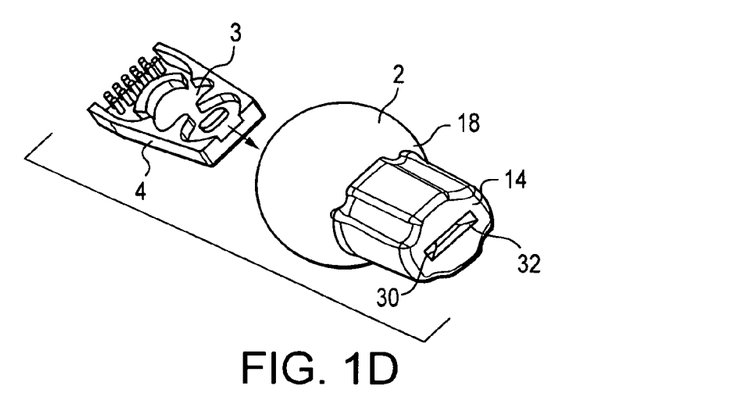

FIGS. 1A-1C show, respectively, a perspective, a top cross-sectional and a side cross-sectional view of the present invention in the form of a fluidic device that operates on a pressurized liquid flowing through said device to generate an oscillating spray of liquid droplets into a surrounding gaseous environment. In this instance, the novelty of the present invention is being illustrated with an enclosure 2 whose outer boundary surface is generic in nature. This enclosure or housing is seen to consist of a body 10 that has an outer boundary surface 12 that includes a front 14 and a rear 16 face and an intermediate boundary surface 18 that connects these faces. A passage or enclosed pathway 20 extends between these faces and has been constructed to have a clearly defined front 22 and rear 24 section or portion. The rear portion of this passage has a sidewall 13 that is configured to form a rectangular cavity 26 into which a rectangular-shaped fluidic oscillator 4 is to be inserted. The intersection of this cavity 26 with the body's rear face 16 forms the opening 28 through which this insertion is accomplished. Meanwhile, the intersection of this pathway 20 with the housings front face forms an exit or outlet 34 for the liquid that flows through the precisely arranged and dimensioned channel 3 that makes up the fluidic circuit of the oscillator 4.

It should be noted that this enclosure 2 is unique in that it allows for the rear loading of a fluidic insert. This can be especially important in various high pressure applications in which such frontally loaded inserts have been observed to be effectively spit from their housings due to excess pressure build-ups behind or upstream of the inserts.

The front portion 22 of this enclosure's passage is also unique in that it is a segment 23 of the enclosure's interior surface that has been configured so as to form another element of the to-be-inserted oscillator's fluidic circuit—both a throat 30 element and a throat expansion region or element 32. Thus, the to-be-inserted fluidic oscillator that would be appropriate for use with this enclosure 2 would not have such elements and its length would therefore be expected to be shorter than the usual similarly-operating fluidic oscillator.

FIG. 1D shows an example of such an enclosure 2 which has a non-generic outer boundary surface 12 and which allows for the rear loading of a fluidic oscillator 4. In this example, the enclosure is for use in a "body spray" assembly which allows the enclosure's spherical shaped rear portion to be held in a spherical shaped cavity that allows one to rotate the enclosure 2 so as to aim the direction of the jet of liquid that issues from its throat 30 and outlet 34.

We have found that constructing fluidic oscillators and their enclosures in this way can great simplify their fabrication and make it much easier to later modify them. We have also found that this arrangement allows for a broader range of geometries to be easily and conveniently fabricated into these pieces. For example, we have been able to fabricate these enclosures so as to have larger expansion angles in their throat expansion regions than could be fabricated into the top or bottom surface of the typical fluidic oscillator. The use of such larger angles has allowed us to produce oscillating sprays that have larger horizontal liquid spreading or fan angles, $\phi$.

While the present invention as disclosed in FIGS. 1A-1C show only an enclosure with a front portion 22 that includes the fluidic circuit elements of a throat 30 and throat expansion region 32, it should be recognized that any of the other known elements of such circuits could have also been included in this front portion 22. For example, fluidic elements that could have been included include an island (see U.S. Pat. No. 4,151,955), a second interaction region (see U.S. Pat. No. 5,860,603), and a horizontal slot in the passage's top or bottom surface (see U.S. Pat. No. 5,971,301). Other possible elements for inclusion are disclosed later in this section.

In working to further improve upon the design of enclosures for fluidic oscillators, it was also discovered that it was possible to create sprays with unique liquid droplet characteristics by utilizing the combined outputs of many, especially selected and uniquely arranged and oriented, fluidic oscillators. This discovery led to our development of unique, fluidic oscillator enclosures having many or a plurality of especially oriented and configured passages 20, each of which can accommodate an inserted fluidic oscillator 4, that extend between such enclosures' front and rear faces.

The unique spray characteristics yielded by these multiple oscillator enclosures were achieved regardless of whether the oscillators were inserted from the rear or from the front. Also, the passages of these multiple oscillator enclosures generally did not have front portions in which there were fabricated elements of a fluidic circuit. Additionally, it was found that the passages of these enclosures could be fabricated so as to not always require that the insertion of the oscillators be total. In some instances, the depth of the insertions needed to be only such as to allow the oscillator to be held firmly in place while allowing the liquid flow from the oscillator to be pointed in a preferred direction.

For assorted showerhead applications, FIGS. 2A-2E show views of the front faces 14 of various multi-cavity or passage enclosures or housings 2 that illustrate some of ways that it has been found to be beneficial to orient the plurality of outlets 34 for the fluidic-oscillator-holding passages/cavities contained in these enclosures. The frontal views of these enclosures also reveal that the perimeter 11 of these housing front faces define circles, but it should be recognized that this is not important to the performance of such showerhead—what is important is the orientation and spacing between the enclosures' cavities and passages 20.

Additionally, while FIGS. 2A-2E appear to show front faces that are defined by a single plane, this need not be the only configuration for such faces. For example, it is within the scope of the present invention to allow the front faces of such enclosures to have complex geometries which allow their passages' outlets to be at different distances in front of or behind a plane that defines the mean x-location (assuming the enclosure's face is generally pointed in what is defined as a coordinate system's x-direction) of the enclosure's front face. Additionally, since, in some instances, the oscillators might not be totally inserted or enclosed by the enclosure's cavities or passages, the actual exits of the oscillators can extend beyond the enclosure's front face and be oriented in directions other than just perpendicular to a plane that generally defines the location of the enclosure's front face.

FIGS. 2A-2D illustrate arrangements in which the outlets 34 and their related passages and cavities are equally-spaced and arranged parallel or proximate to the sides of various types of polygons (i.e., A—an octagon, B & C—a square, D—a triangle) or bounded figures that are composed of a plurality of straight line segments. In addition to being parallel to the polygons' sides, the outlets could also be at one or more prescribed angles (i.e., proximate) to the sides—if they were at ninety degrees to the sides of a small square, the outlet arrangement shown in FIG. 2E results. Furthermore, while FIGS. 2A-2D show only one polygon or bounded figure with a center at the center-point of the front face being used to locate the outlets in the front faces of these enclosures, it is within the scope of the present invention to use more than one or a plurality of polygons or bounded figures to locate an enclosure's outlets; see FIG. 4. Similarly, the sides of these polygons could be the location of not just one, but two or more of the outlets.

Figure 2A:
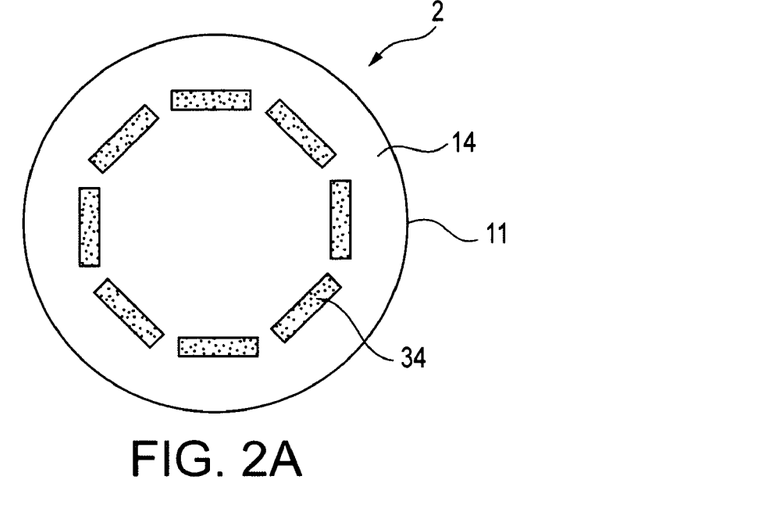
Figure 2B:
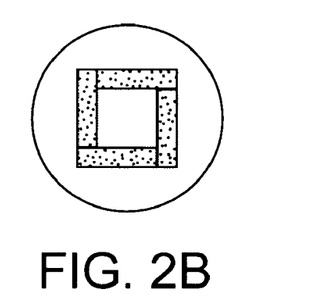
Figure 2C:
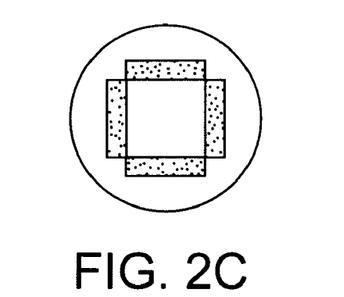
Figure 2D:
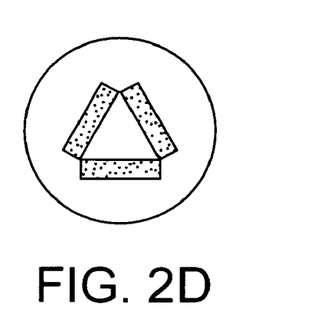
Figure 2E:
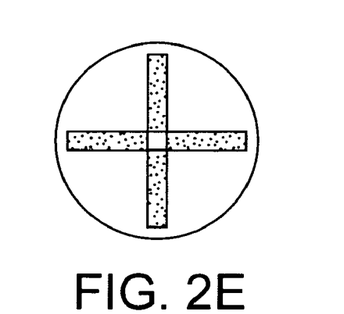

FIG. 2E illustrates an arrangement in which the outlets 34 and their related passages and cavities are equally-spaced and arranged on one of a plurality of lines or spokes that spread out or emanate from the face's center or center-point (i.e., shown here in a four spoke arrangement, although other numbers of spokes could be used and should be considered to fall within the scope of the present invention).

It should be noted that there are many other ways, rather than just those shown in FIGS. 1-4, to orient the outlets 34 for the fluidic-oscillator-holding passages/cavities of the present invention. For example, an enclosure's passages/cavities can be arranged such that: (a) they're in adjoining rows in which the centerlines of the passages may or may not be aligned, (b) rather than have just a single center-point around which the passages are symmetrically oriented, one could have two or more of such center-points on the outer face of the enclosure and about which the passages are oriented, and (c) the spacing between the cavities need not be uniform and equidistant.

Additionally, it can be noted that the front-to-rear centerlines of the plurality of oscillators that fit into the cavities of the FIGS. 2A-2E enclosures can in these figures be assumed to be perpendicular to the assumed planar front faces of these enclosures. However, this need not be the case. In some instances, it may be beneficial to angle the front-to-rear centerlines of the cavities or passages 20 of these enclosures so that they make a specified, non-90 degree, intersection angle with the plane that defines the front face of the enclosures. Furthermore, all the cavities for an enclosure need not have the same intersection angles. All of these different such cavity orientations are considered to come within the scope of the present invention.

To demonstrate how the discoveries of the present invention can be used to design a showerhead having a desired distribution of spray droplets, consider the following example. Suppose that it is desired to uniformly cover a surface area having dimensions of 35 cm×12 cm and which is located at a distance of 30 cm in front of a showerhead. Further, assume that the coverage is to be with droplets having a mean diameter of approximately 2 mm and an average velocity of approximately 4 msec. This is to be accomplished with a showerhead operating at 1.6 gpm at approximately 10 psi and having four or fewer orifices so as to make these orifices large enough to minimize the possibility that they will become clogged.

Until the teachings of the present invention, this task would have been virtually impossible since the known spray devices that could cover the targeted area cannot do so uniformly with droplets of the desired size and velocity. However, we have discovered that the above requirements can be met by utilizing a four-cavity enclosure similar to that whose front face is similar to that shown in FIG. 2C and whose cavities are sized so as to accommodate fluidic oscillators that employ fluidic circuits like those shown in U.S. Pat. No. 6,253,782 (mushroom oscillator).

FIG. 3 shows the body 10 of the actual enclosure 2 or housing used in this application. The four fluidic oscillators 4A-4D that are inserted into the openings 28 in its rear face 16 are shown. The body's intermediate boundary surface is seen to be configured with a threaded region 36 so as to allow it to fit within and be mated to the surrounding parts that make up a complete showerhead.

The fluidic oscillators that have been chosen for this application have been especially sized and proportioned so that, at the fluid pressures and flow rates at which they'll be operating, they cause the liquid jets that flow from them to oscillate at a frequency of approximately 50 hertz and with the wavelength of approximately 10 cm. The result is a large area spray that, to the human touch, has very pleasing, vigorous (because of the relatively high velocity and large diameter of the droplets) massaging qualities.

Furthermore, this spray is achieved at surprisingly low flow rates (i.e., ranges of 1.2-1.9 gpm versus non-fluidic, spray heads operating in the range of 2.0-2.5 gpm) as compared to those used by the currently available, non-fluidic, massaging spray heads which cover significantly smaller surface areas.

With a wide range of fluidic circuits from which to chose and with many of these offering quite different flow characteristics, it would appear that there exists an almost infinite number of especially designed spray droplet distributions that can be achieved by utilizing enclosures or housings that have multiple, strategically oriented cavities or passages in which are situated appropriately configured and sized fluidic oscillators.

To provide maximum design flexibility in the design of a showerhead using multiple fluidic oscillators, it should be recognized that the oscillators in these especially configured enclosures need not be all of the same kind. For example, oscillators with differing fan angles, oscillation frequencies, droplet sizes and velocities can be utilized together to yield an almost infinite number of sprays. All of these combinations are considered to be within the teachings of the present invention.

Figure 4:
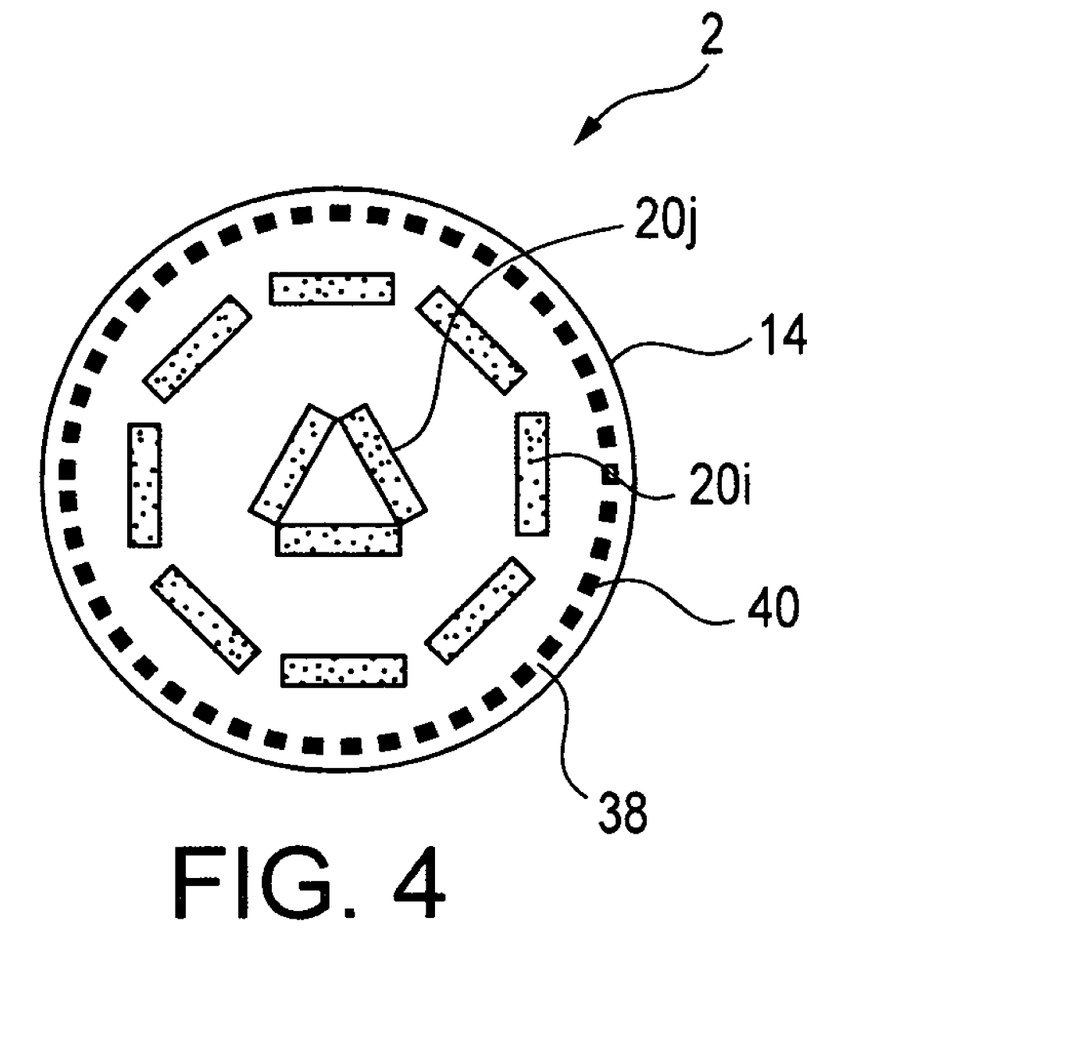

Additionally, it can be noted that, using the teachings of the present invention, one can design a showerhead that has improved performance with multiple modes of operation. FIG. 4 shows the front face 14 of a multi-cavity enclosure 2 that allows for the multiple mode operation of any showerhead that uses such a fluidic assembly. The perimeter of this housing 2 is seen to have a ring or geometrical arrangement 38 of conventional orifices 40 that emit a conventional, non-oscillating jet spray intended primarily for rinsing purposes.

Within this ring there exists an octagonal array of eight fluidic-oscillator-containing passages 20i in which the oscillators that are inserted into these passages have been chosen so that they generate sprays whose droplet characteristics are favorable for rinsing purposes. Proximate to and within this array and surrounding the center or center-point of this face is a triangular array of three fluidic-oscillator-containing passages 20j whose inserted oscillators are chosen for their ability to output sprays that are ideally suited for massaging purposes. By judiciously choosing the nature of the fluidic oscillators that are inserted into these passages, one can, as described below, improve the performance of such a multi-operating-mode showerhead.

Limited data suggests that most users of the conventional multi-operating-mode showerheads tend to keep their selector switches turned to only a single mode of operation, even when these users indicate that they would often prefer a mode of operation in which they were using a combination of the multiple modes available with such showerheads (i.e., a combination of rinsing and massaging sprays). This is apparently the situation because such combined modes of operation are reported to suffer from the problem of the inadequate spray velocities. This is believed to be due to the massaging spray outlets robbing water flow from the otherwise well performing rinse spray outlets. Both features perform well in their own right but when combined, both sprays suffer performance degradation.

The showerhead which utilizes the new enclosure illustrated in FIG. 4 is seen to overcome this problem of inadequate spray velocities. At standard operating pressures, the oscillators in the octagonal array of passages 20i yield, for rinsing purposes, spray velocities of about 6 msec in comparison to the orifices a conventional showerhead that yield 3.5-5.2 in/sec. Alternatively, these oscillators can operate at 1.6 gpm to yield spray velocities that conventional showerheads can only yield at flow rates of 2.5 gpm Meanwhile, the oscillators in the triangular array 20j yield, for massaging purposes, spray velocities of about 7.5 msec over an area of greater than 30 inches$^2$ as compared to the orifices of a conventional showerhead that yields 5.0-7.5 msec over an area of only about 5 inches$^2$. In a combined mode of operation, the octagonal array of passages 20i yield spray velocities of about 5 msec in comparison to the orifices of a conventional showerhead that yield less than 2.5 msec, while the triangular array 20j yield spray velocities of about 6.5 msec in comparison to the orifices of a conventional showerhead that yields less than 5.5 msec.

Figure 5A:
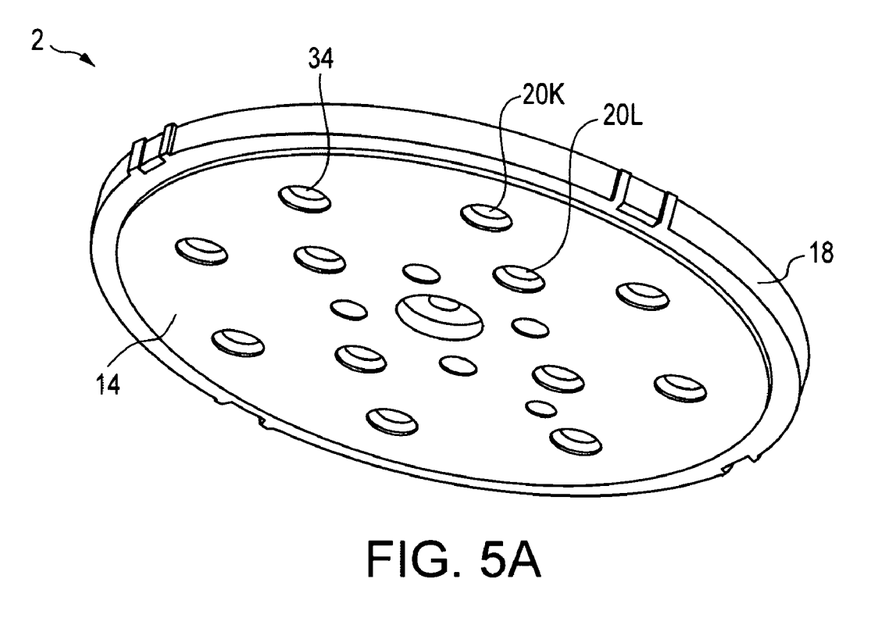
Figure 5B:
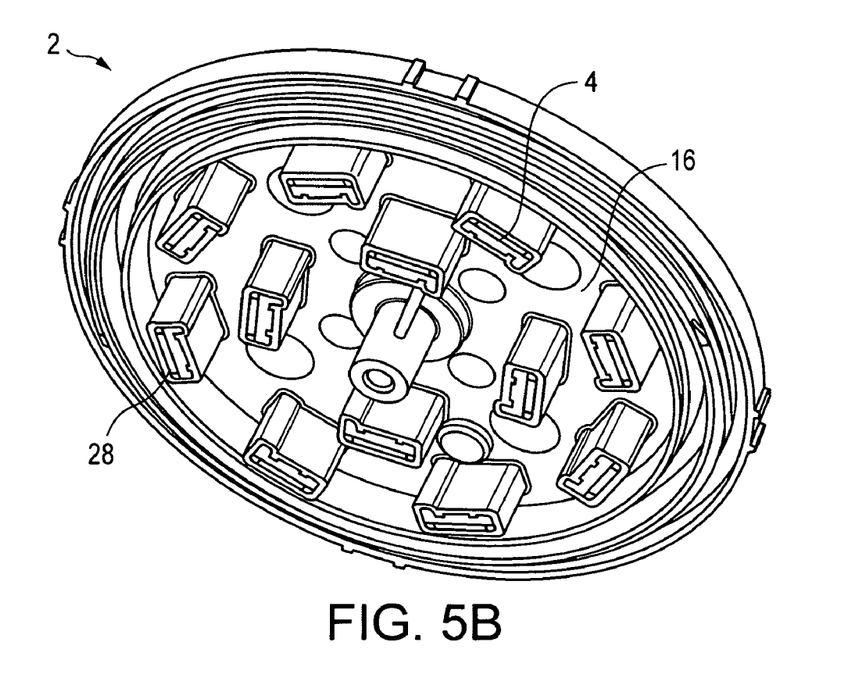

FIG. 5A-5B show perspective views of the front and rear faces, respectively, of a commercial version of the present invention in the form of a housing that accommodates twelve fluidic oscillators. The geometrical arrangement of this housing's twelve passages 20 and their inserted oscillators 4 is seen to consist of an outer octagonal array of eight fluidic-oscillator-containing passages 20k that is centered on the center-point of the front face. Inside this outer array is located an inner array of four fluidic-oscillator-containing passages 20l that is also centered on the center-point of the enclosure's front face.

The foregoing is considered as illustrative only of the principles of the invention. Further, since numerous modifications and changes will readily occur to those skilled in the art, and because of the wide extent of the teachings disclosed herein, the foregoing disclosure should not be considered to limit the invention to the exact construction and operation shown and described herein. Accordingly, all suitable modifications and equivalents of the present disclosure may be resorted to and still considered to fall within the scope of the invention as hereinafter set forth in the claims.

We claim:

1. A fluidic device that operates on a pressurized liquid flowing through said device at a specified flow rate to generate an oscillating spray of liquid droplets into a surrounding gaseous environment that has desired properties chosen from the group consisting of average spatial distribution, size, velocity, frequency and wavelength of said liquid droplets at a defined distance in front of said device, said device comprising:
   a plurality of fluidic oscillators, each having a channel that is part of a fluidic circuit for inducing oscillations in said pressurized liquid that flows through said oscillator so as to emit a liquid jet in the form of an oscillating spray of liquid droplets,
   a housing having an exterior surface that includes a front face and a rear face and an intermediate boundary surface that connects said faces, said front face having a center-point,
   a plurality of passages, each of which extends through said housing and intersects with said front and rear faces,
   each of said passages configured to allow for the insertion of one of said plurality of fluidic oscillators into each of said plurality of passages,
   wherein said intersections of said plurality of passages with said housing front face defining a plurality of outlets, and
   a geometrical arrangement of said outlets in said housing front face that is chosen so as to achieve said desired properties of said oscillating spray with said device operating at said specified flow rate.

2. The fluidic device as recited in claim 1, wherein:
   said geometrical arrangement of outlets chosen from the group consisting of one or more of each said outlets arranged proximate the sides of one or more polygons that are centered at the center-point of said housing front face, or one or more of each of said outlets arranged on one of a plurality of radial lines that emanate from the center-point of said front face, or a combination of these prior listed arrangements that make up said group.

3. The fluidic device as recited in claim 1 wherein:
   each of said channels of said fluidic oscillators having dimensions that are chosen so as to achieve said desired properties of said oscillating spray with said device operating at said specified flow rate.

4. The fluidic device as recited in claim 2 wherein:
   each of said channels of said fluidic oscillators having dimensions that are chosen so as to achieve said desired properties of said oscillating spray with said device operating at said specified flow rate.

5. The fluidic device as recited in claim 1 wherein:
   said geometrical arrangement of outlets includes one of each said outlets arranged proximate the sides of an octagon that is centered at the center-point of said housing front face and a square that is centered at the center-point of said housing front face.

6. The fluidic device as recited in claim 3 wherein:
   said geometrical arrangement of outlets includes one of each said outlets arranged proximate the sides of an octagon that is centered at the center-point of said housing front face and a square that is centered at the center-point of said housing front face.

7. The fluidic device as recited in claim 1 further comprising:

said housing front face having at least one geometrical arrangement of a plurality of conventional orifices that emit conventional, non-oscillating jet sprays.

8. The fluidic device as recited in claim 2 further comprising:
said housing front face having at least one geometrical arrangement of a plurality of conventional orifices that emit conventional, non-oscillating jet sprays.

9. The fluidic device as recited in claim 3 further comprising:
said housing front face having at least one geometrical arrangement of a plurality of conventional orifices that emit conventional, non-oscillating jet sprays.

10. The fluidic device as recited in claim 4 further comprising:
said housing front face having at least one geometrical arrangement of a plurality of conventional orifices that emit conventional, non-oscillating jet sprays.

11. A method of making a fluidic device that operates on a pressurized liquid flowing through said device at a specified flow rate to generate an oscillating spray of liquid droplets into a surrounding gaseous environment that has desired properties chosen from the group consisting of average spatial distribution, size, velocity, frequency and wavelength of said liquid droplets at a defined distance in front of said device, said method comprising the steps of:
forming a plurality of fluidic oscillators, each having a channel that is part of a fluidic circuit for inducing oscillations in said pressurized liquid that flows through said oscillator so as to emit a liquid jet in the form of an oscillating spray of liquid droplets,
forming a housing having an exterior surface that includes a front face and a rear face and an intermediate boundary surface that connects said faces, said front face having a center-point,
forming a plurality of passages, each of which extends through said housing and intersects with said front and rear faces,
each of said passages configured to allow for the insertion of one of said plurality of fluidic oscillators into each of said plurality of passages,
wherein said intersections of said plurality of passages with said housing front face defining a plurality of outlets, and
forming a geometrical arrangement of said outlets in said housing front face that is chosen so as to achieve said desired properties of said oscillating spray with said device operating at said specified flow rate.

12. The method of making a fluidic device as recited in claim 11, wherein:
said geometrical arrangement of outlets chosen from the group consisting of one or more of each said outlets arranged proximate the sides of one or more polygons that are centered at the center-point of said housing front face, or one or more of each of said outlets arranged on one of a plurality of radial lines that emanate from the center-point of said front face, or a combination of these prior listed arrangements that make up said group.

13. The method of making a fluidic device as recited in claim 11 wherein:
each of said channels of said fluidic oscillators having dimensions that are chosen so as to achieve said desired properties of said oscillating spray with said device operating at said specified flow rate.

14. The method of making a fluidic device as recited in claim 12 wherein:
each of said channels of said fluidic oscillators having dimensions that are chosen so as to achieve said desired properties of said oscillating spray with said device operating at said specified flow rate.

15. The method of making a fluidic device as recited in claim 11 wherein:
said geometrical arrangement of outlets includes one of each said outlets arranged proximate the sides of an octagon that is centered at the center-point of said housing front face and a square that is centered at the center-point of said housing front face.

16. The method of making a fluidic device as recited in claim 13 wherein:
said geometrical arrangement of outlets includes one of each said outlets arranged proximate the sides of an octagon that is centered at the center-point of said housing front face and a square that is centered at the center-point of said housing front face.

17. The method of making a fluidic device as recited in claim 11 further comprising the step of:
forming on said housing front face having at least one geometrical arrangement of a plurality of conventional orifices that emit conventional, non-oscillating jet sprays.

18. The method of making a fluidic device as recited in claim 12 further comprising the step of:
forming on said housing front face having at least one geometrical arrangement of a plurality of conventional orifices that emit conventional, non-oscillating jet sprays.

19. The method of making a fluidic device as recited in claim 13 further comprising the step of:
forming on said housing front face having at least one geometrical arrangement of a plurality of conventional orifices that emit conventional, non-oscillating jet sprays.

20. The method of making a fluidic device as recited in claim 14 further comprising the step of:
forming on said housing front face having at least one geometrical arrangement of a plurality of conventional orifices that emit conventional, non-oscillating jet sprays.

* * * * *